(12) United States Patent
Lin (10) Patent No.: US 6,672,553 B1
(45) Date of Patent: Jan. 6, 2004

(54) SUSPENSION ARM

(76) Inventor: Chin-Chih Lin, 3F, No. 128, Cha-Zhuang 1st Street, Kuei Shan, Taoyuan Hsien (TW)

( * ) Notice: Subject to any disclaimer, the term of this patent is extended or adjusted under 35 U.S.C. 154(b) by 0 days.

(21) Appl. No.: 10/299,691

(22) Filed: Nov. 20, 2002

(30) Foreign Application Priority Data

Aug. 26, 2002 (TW) .................................. 091213250 A
Oct. 1, 2002 (TW) .................................. 091215530 A (51) Int. Cl.⁷ .............................................. E04G 3/00
(52) U.S. Cl. .............................. 248/276.1; 248/284.1; 248/286.1; 248/921
(58) Field of Search ........................ 248/284.1, 286.1, 248/921, 278.1, 279.1, 917, 918, 920, 922, 923, 281.11, 292.11, 276.1, 280.1

(56) References Cited

U.S. PATENT DOCUMENTS

| | | | | |
|---|---|---|---|---|
| 4,834,329 A | * | 5/1989 | Delapp | 248/183.3 |
| 5,180,136 A | * | 1/1993 | Sova | 248/576 |
| 5,743,503 A | * | 4/1998 | Voeller et al. | 248/284.1 |
| 5,779,209 A | * | 7/1998 | Rello | 248/278.1 |
| 5,799,917 A | * | 9/1998 | Li | 248/284.1 |
| 5,975,472 A | * | 11/1999 | Hung | 248/278.1 |
| 6,012,693 A | * | 1/2000 | Voeller et al. | 248/280.11 |
| 6,113,046 A | * | 9/2000 | Wang | 248/278.1 |
| 6,186,460 B1 | * | 2/2001 | Lin | 248/284.1 |
| 6,394,403 B1 | * | 5/2002 | Hung | 248/276.1 |
| 6,478,275 B1 | * | 11/2002 | Huang | 248/284.1 |
| 6,565,056 B2 | * | 5/2003 | Lin | 248/284.1 |
| 6,592,090 B1 | * | 7/2003 | Li | 248/284.1 |

* cited by examiner

Primary Examiner—Kimberly Wood
(74) Attorney, Agent, or Firm—Troxell Law Office PLLC (57) ABSTRACT

A suspension arm is constructed to include a mounting base for fastening to the top of a table by a mounting assembly, an axle block, a link pivotally coupled between the mounting base and the axle block, a gyro block pivoted to the a axle block to hold a swivel holder for holding a article, an elongated hollow support, the support arm having two bottom clamping plates arranged pivotally coupled to the mounting base and two top eyelets pivotally coupled to the gyro block, a first torsion mechanism adapted to lock the support arm and the mounting base, a second torsion mechanism adapted to lock the support arm and the gyro block, and a traction mechanism connected between the gyro block and the support arm and adapted to share the burden of the weight of the article to be carried on the suspension arm.

18 Claims, 10 Drawing Sheets

SUSPENSION ARM

BACKGROUND OF THE INVENTION

1. Field of the Invention

The present invention relates to a suspension arm and, more particularly, to such a suspension arm, which has one end pivotally connectable to a supported device, for example, a LCD, and the other adapted to be fixedly fastened to a fixed support means.

2. Description of the Related Art

A good suspension arm, in addition to the basic function of holding the device to be supported, has adjustment functions, more particularly the forward backward distance adjustment function, the horizontal rotary adjustment function, and the angle tilting adjustment function. Manufacturers are trying hard to develop orthopedically engineered suspension arms to fit consumers' different requirements.

Following fast development of high technology, LCDs (liquid crystal displays) are intensively used instead of conventional CRT monitors for the advantages of thin thickness and light weight. For supporting a LCD on a table, a universal suspension arm may be used. However, because a LCD has a certain weight, for example, a 15" LCD weighs about 1.8~3.5 kgs. When adjusting the angular position of the LCD, the user shall have to employ much force to the suspension arm. Further, when the LCD adjusted to the desired forward-backward distance, the user shall have to adjust the suspension arm to correct the tilting angle of the LCD.

SUMMARY OF THE INVENTION

The present invention has been accomplished under the circumstances in view. It is the main object of the present invention to provide a suspension arm, which can easily be adjusted with less effort.

It is still another object of the present invention to provide a suspension arm, which enables the user to adjust the elevation, forward-backward distance, and tilting angle of the article supported thereon conveniently.

To achieve these and other objects of the present invention, the suspension arm comprises a mounting base for fastening to the top of a table by a mounting assembly, an axle block, a link pivotally coupled between the mounting base and the axle block, a gyro block pivoted to the axle block to hold a swivel holder for holding a article, an elongated hollow support, the support arm having two bottom clamping plates arranged pivotally coupled to the mounting base and two top eyelets pivotally coupled to the gyro block, a first torsion mechanism adapted to lock the support arm and the mounting base, a second torsion mechanism adapted to lock the support arm and the gyro block, and a traction mechanism connected between the gyro block and the support arm and adapted to share the burden of the weight of the article to be carried on the suspension arm.

BRIEF DESCRIPTION OF THE DRAWINGS

The present invention can be more fully understood by reference to the following detailed description and accompanying drawings, in which.

DETAILED DESCRIPTION OF THE PREFERRED EMBODIMENT

Referring to FIGS. 1~4, a suspension arm in accordance with the first embodiment of the present invention is shown comprised of a mounting base 1, a first torsion mechanism 2, a link 3, a gyro block 4, a support arm 5, a second torsion mechanism 6, and a swivel holder 7.

Figure 1:
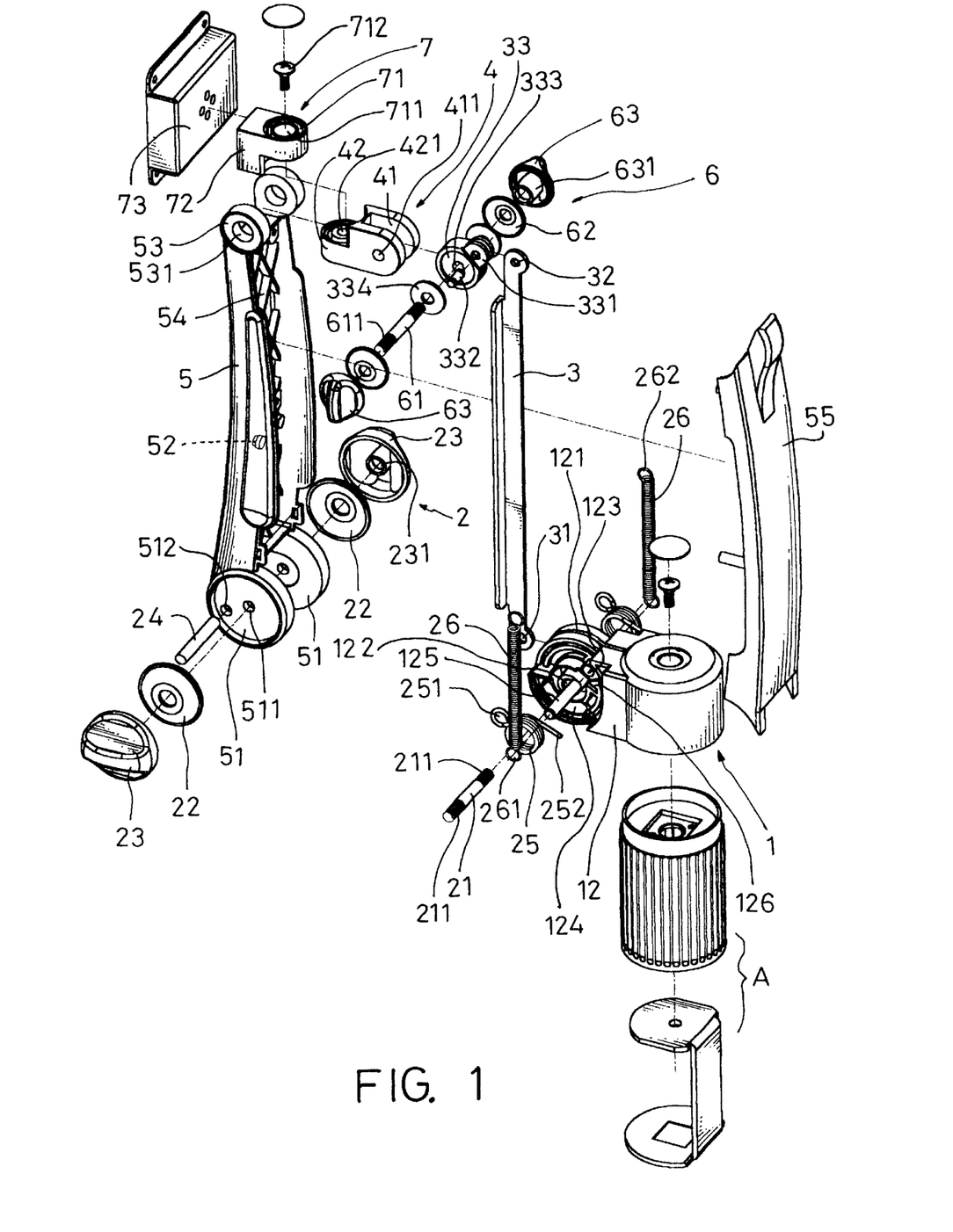
FIG. 1 is an exploded view of a suspension arm according to the first embodiment of the present invention.
Figure 2:
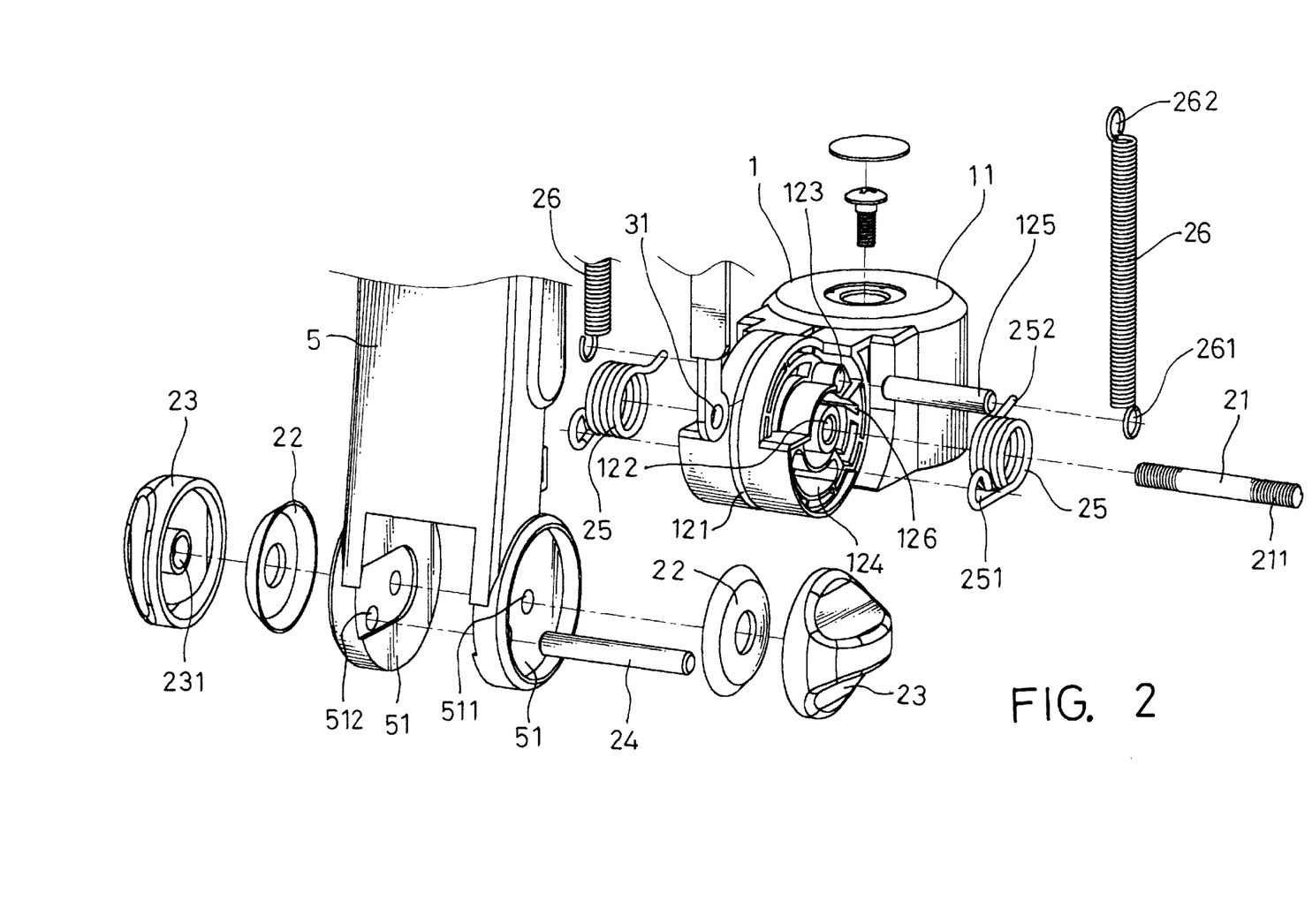
FIG. 2 is an exploded view in an enlarged scale of the lower part of the first embodiment of the present invention.

The mounting base 1 comprises a cap-like body 11 connectable to a mounting assembly A (for example, the disclosure of Taiwan Utility No. 159327 equivalent to U.S. Pat. No. 6,299,171 B1), and a circular locating block 12 forwardly protruded from the periphery of the cap-like body 11. By means of the mounting assembly A, the mounting base 1 can be fixedly fastened to a fixed support, for example, the top of a table. The circular locating block 12 has a split 121 radially extended on the middle and adapted to receive the bottom end of the link 3, a center axle hole 122 extended through the two opposite lateral sidewalls thereof at the center, two pin holes 123 aligned in the two opposite lateral sidewalls, and two arched guide slots 124 respectively disposed in the two opposite lateral sidewalls. A pivot pin 125 is mounted in the pin holes 123 and the bottom eyelet 31 of the link 3 to pivotally secure the bottom end of the link 3 to the mounting base 1. The circular locating block 12 of the mounting base 1 is inserted in between the two bottom clamping plates 51 of the support arm 5 and secured thereto in position by the first torsion mechanism 2.

The first torsion mechanism 2 comprises a screw rod 21 inserted through the center through hole 511 of each of the two bottom clamping plates 51 of the support arm 5 and the center axle hole 122 of the circular locating block 12 of the mounting base 1, the screw rod 21 having two reversed threads 211 at the two ends thereof, two spring members, for example, spring washers 22 respectively mounted on the screw rod 21 at two sides of the bottom clamping plates 51, and two knobs 23 respectively fastened to the screw rod 21 to secure the spring washers 22 in place and to force the bottom clamping plates 51 against the two opposite lateral sidewalls of the circular locating block 12. The knobs 23 each have a female screw 231 respectively threaded onto the threads 211 of the screw rod 21. When the knobs 23 loosened, the support arm 5 and the link 3 can be turned forwards or backwards relative to the circular locating block 12 to change the forward-backward distance of the supported article, for example, a LCD B.

In order to let the support arm 5 have an auto return function, a guide pin 24 is inserted through a pin hole 512 of each of the bottom clamping plates 51 of the support arm 5 and the arched guide slots 124 of the circular locating block 12, and two torsional springs 25 are mounted on the screw rod 21 at two sides of the circular locating block 12 and connected between the guide pin 24 and the circular locating block 12. The torsional springs 25 each have a hooked first end 251 respectively hooked on the ends of the guide pin 24 and a second end 252 fastened to a respective locating notch 126 in the center axle hole 122 of the circular locating block 12. When turning the support arm 5 forwards, the guide pin 24 is moved along the arched slots 124 of the circular locating block 12 to tighten the torsional springs 25. However, when released the knobs 23, the torsional springs 25 extend out to return the support arm 5 to its former position.

In order to enhance the auto return function of the support arm 5, two tensile springs 26 are bilaterally coupled between the pivot pin 125 and the support arm 5. The tensile springs 26 each have a bottom end 261 hooked on one end of the pivot pin 125, and a top end 262 hooked on a respective protruded portion 52 at the inside of the support arm 5. When the support arm 5 turned forwards, the tensile springs 26 are stretched. When the support arm 5 released from the constraint, the tensile springs 26 pull the support arm 5 backwards to its former position.

Figure 3:
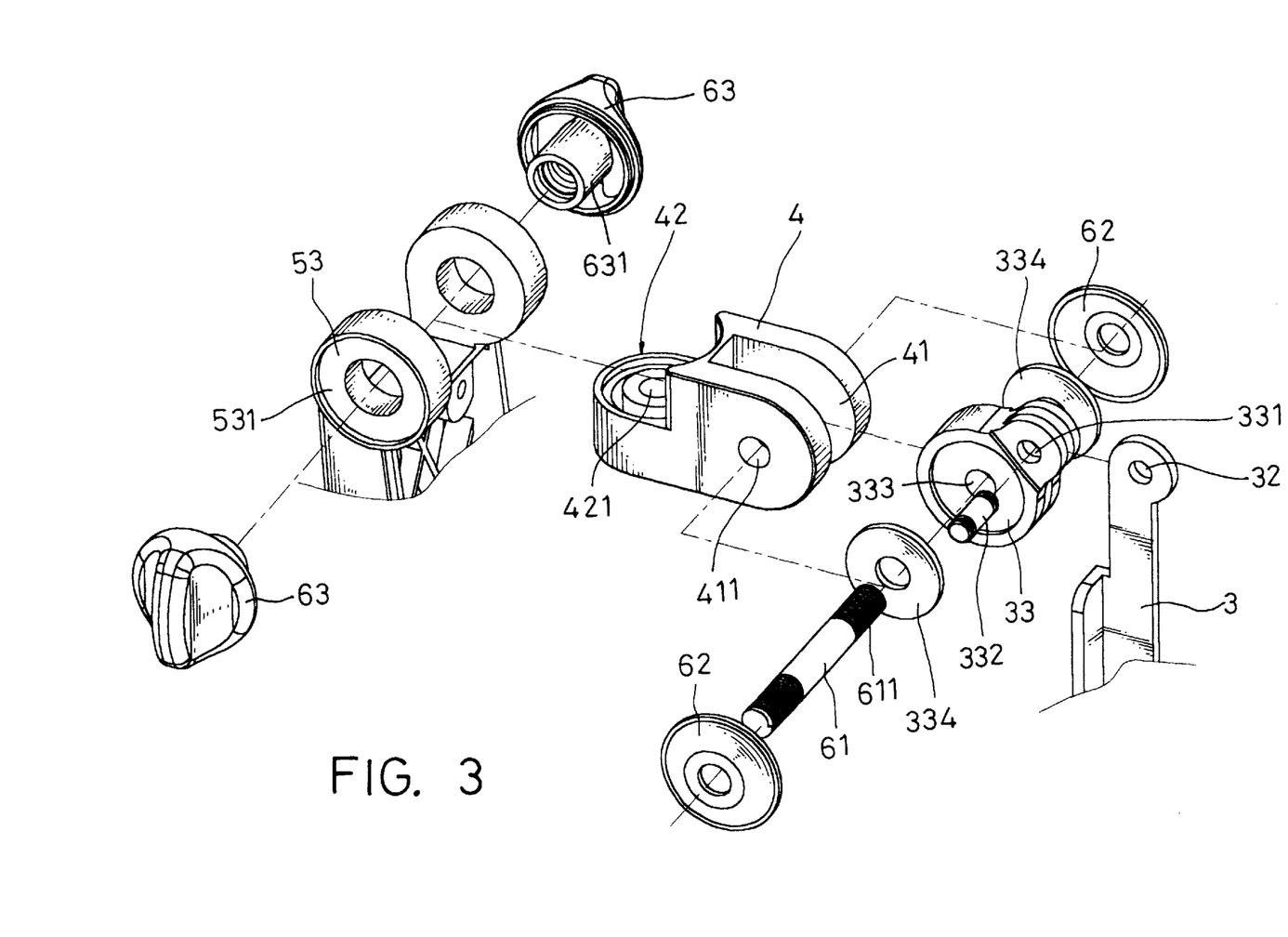
FIG. 3 is an exploded view in an enlarged scale of the upper part of the first embodiment of the present invention.

The link 3 is a rod member having a bottom eyelet 31 and a top eyelet 32. The bottom eyelet 31 of the link 3 is inserted into the split 121 of the circular locating block 12 and coupled to the pivot pin 125. The top eyelet 32 of the link 3 is inserted in between two eyed lugs 331 of an axle block 33 and pivotally secured thereto by a pivot pin 332. The axle block 33 has a center through hole 333, and two friction rings 334 respectively set in two recessed opposite sidewalls thereof. The axle block 33 with the friction rings 334 are inserted in between two parallel arms 41 of the gyro block 4 and secured thereto by the second torsion mechanism 6.

The gyro block 4 is a stepped block having two parallel arms 41 coupled to the axle block 33, and a circular body 42 integral with the arms 41 at one end. The arms 41 each have a transverse through hole 411 respectively aimed at the center through hole 333 of the axle block 33 for the passing of the screw rod 61 of the second torsion mechanism 6. The circular body 42 has a vertical center through hole 421 coupled to the swivel holder 7.

The support arm 5 is an elongated hollow member adapted to receive the link 3, comprising two bottom clamping plates 51, two parallel top eyelets 53, a plurality of intersected reinforcing ribs 54, which reinforce the structural strength of the support arm 5, and two protruded portions 52 spaced between the bottom clamping plates 51 and the top eyelets 53 and respectively fastened to the top ends 262 of the tensile springs 26. The bottom clamping plates 51 each have a center through hole 511, which receives the screw rod 21 of the first torsion mechanism 2, and an eccentric pin hole 512, which receives the guide pin 24 of the first torsion mechanism 2. Further, a cover 55 is fastened to support arm 5 to keep the link 3 from sight. The top eyelets 53 each have a center through hole 531 for receiving the female screw 631 of the corresponding knob 63 of the second torsion mechanism 6.

The second torsion mechanism 6 comprises a screw rod 61 inserted through the center through holes 531 of the top eyelets 53 of the support arm 5 and the through holes 411 of the arms 41 of the gyro block 4, the screw rod 61 having two reversed screws 611 at the ends, two spring members, for example, spring washers 62 respectively mounted on the screw rod 61 at two sides of the top eyelets 53, and two knobs 63 respectively fastened to the screw rod 61 to secure the spring washers 62 and the screw rod 61 to the gyro block 4 and the support arm 5. The knobs 63 each have a female screw 631 respectively inserted into the center through holes 531 of the top eyelets 53 and threaded into the reversed threads 611 of the screw rod 61.

The swivel holder 7 comprises a stepped holder block 71, and a mounting frame 73. The stepped holder block 71 has a vertical mounting hole 711 connected to the vertical center through hole 421 of gyro block 4 by a screw 712, and a front support portion 72. The mounting frame 73 is fixedly fastened to the front support portion 72 to hold, for example, a LCD B. When the screw 712 loosened, the swivel holder 7 can be turned horizontally about the axis passing through the vertical center through hole 421 of the gyro block 4 to adjust the angular position of the LCD B horizontally.

Figure 4:
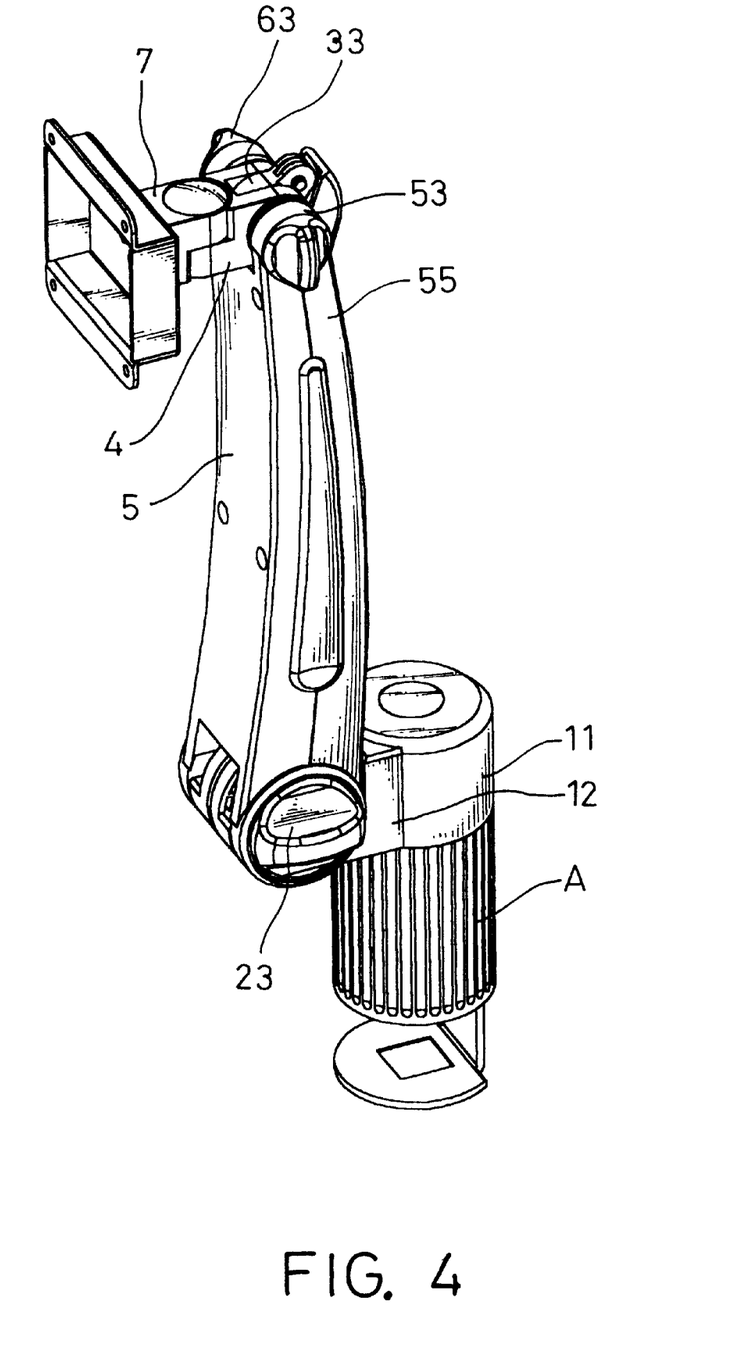
FIG. 4 is a perspective assembly view of the first embodiment of the present invention.
Figure 5:
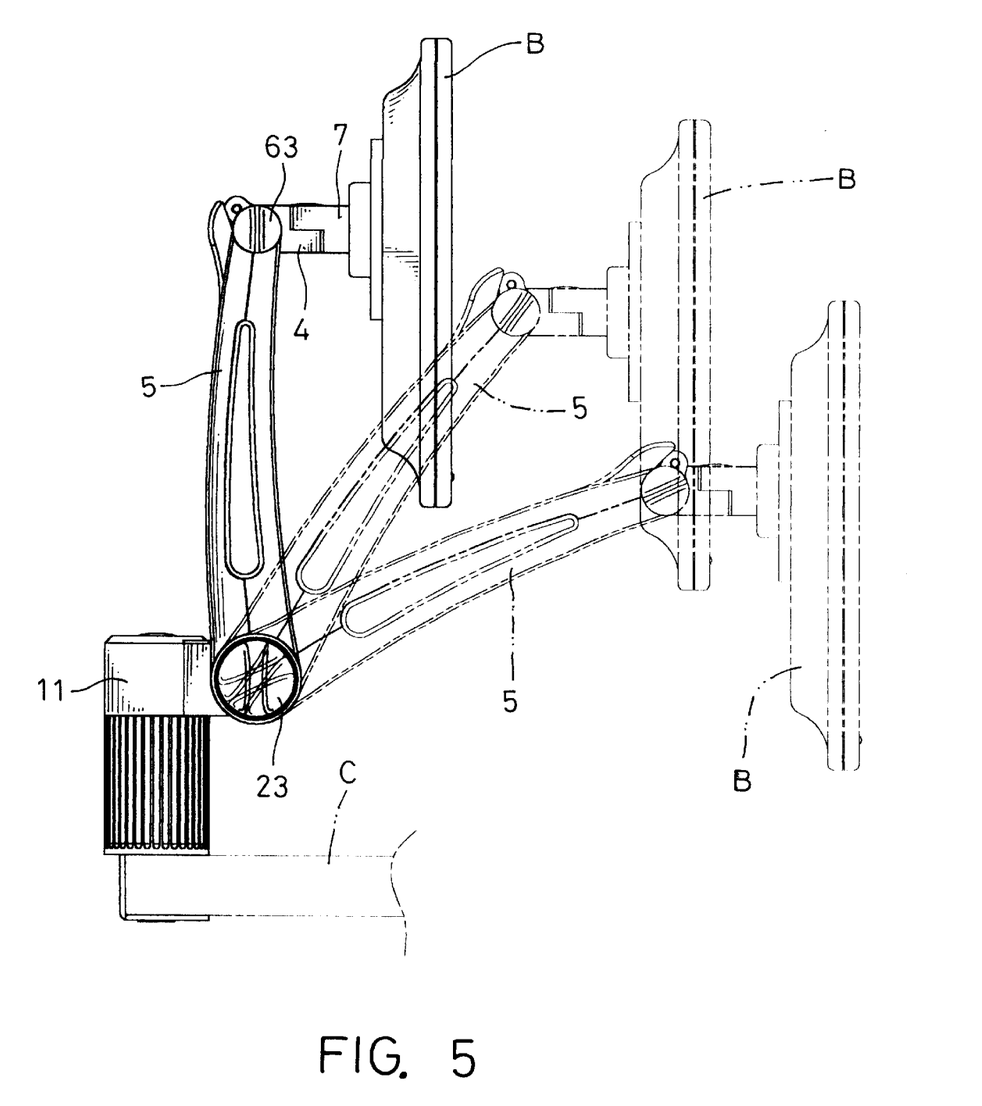
FIG. 5 is a schematic drawing of the first embodiment of the present invention, showing the adjustment of the support arm relative to the mounting base.

FIG. 4 shows the suspension arm assembled. When assembled, the LCD B is fastened to the mounting frame 73, and then the mounting base 1 is fastened to the top of a table C by a mounting assembly A, as shown in FIG. 5. When wishing to adjust the LCD B forwards, rotate one knob 23 to adjust the pressure of the spring washers 22 against the bottom clamping plates 51 and the circular locating block 12. At this time, the effect of the torsional springs 25 and the tensile springs 26 keeps the support arm 5 in position, preventing movement of the support arm 5 relative to the circular locating block 12. Thereafter, turn the support arm 5 downwards. When turning the support arm 5 downwards, the link 3 is moved with the support arm 5 in the split 121 of the circular locating block 12 to fasten up the torsional spring 25 and to extend out the tensile spring 26, enabling the support 5 to be positioned on the mounting base 1 at the desired angle.

The distance between the pivot pin 125 and the pivot pin 332 (the length of the link 3) is approximately equal to the distance between the screw rod 21 and the screw rod 61, therefore the pivot pins 125 and 332 and the screw rods 21 and 61 form a parallelogram, i.e., the pivot pin 125 and the screw rod 21 are the fixed sides, and the relative distance between the pivot pin 332 and the screw rod 61 does not change when the support arm 5 turned relative to the mounting base 1. Therefore, adjusting the angular position of the support arm 5 does not change the position of the LCD B.

Figure 6:
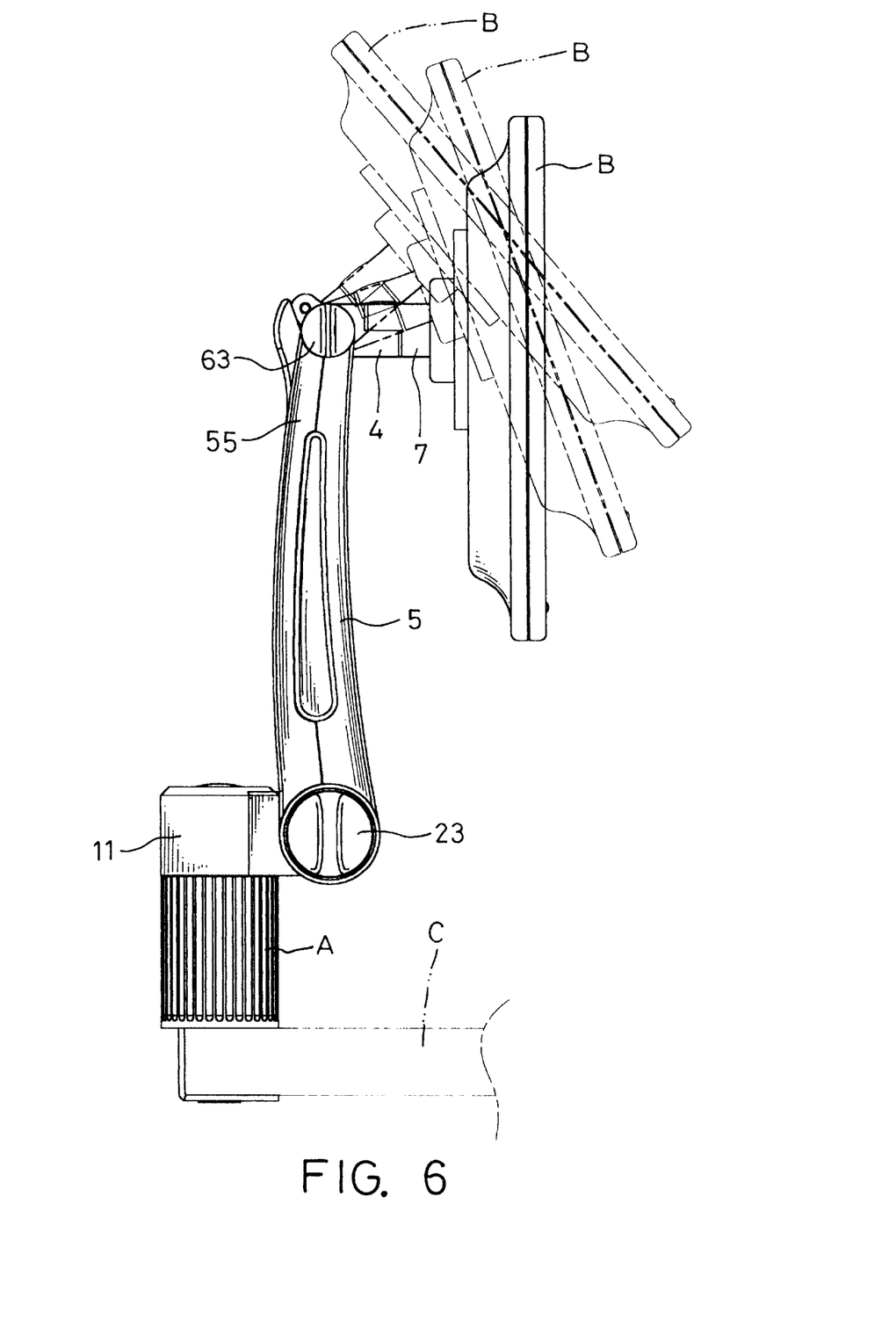
FIG. 6 is a schematic drawing of the first embodiment of the present invention showing the adjustment of the gyro block with the LCD relative to the support arm.

Further, as indicated above, when the second torsion mechanism 6 imparting a proper torsional force to the gyro block 4 and the axle block 33, the gyro block 4 is retained in position. Therefore, the tilting angle of the gyro block 4 can easily be adjusted as shown in FIG. 6. By means of turning the swivel holder 7 horizontally leftwards or rightwards relative to the gyro block 4, the LCD B is horizontally turned leftwards or rightwards to the desired position. Therefore, the when first torsion mechanism 2 locks the support arm 5 and the circular locating block 12, the user can only adjust the tilting angle of the gyro block 4 relative to the axle block 33. On the contrary, when the second torsion mechanism 6 locks the gyro block 4 and the axle block 33, the user can only change the angular position of the support arm 5 relative to the circular locating block 12.

FIGS. 7~10 show a suspension arm in accordance with the second embodiment of the present invention. This embodiment is substantially similar to the aforesaid first embodiment with the exception of the arrangement of a traction mechanism 43 between the gyro block 4 and the support arm 5. The arms 41 each have an annular groove 412 around the respective transverse through hole 411 and a top notch 413 extended to the annular groove 412. The traction mechanism 43 comprises two connecting devices 431 and two tensile springs 432. The connecting devices 431 each comprise a cord member 431b inserted through the top notch 413 of one arm 41 of the gyro block 4, a first eyelet 431a provided at one end of the cord member 431b and hung on the screw rod 61 of the second torsion mechanism 6, and a second eyelet 431c at the other end of the cord member 431b and hung on one end of the corresponding tensile spring 432. The other end of each tensile spring 432 is connected to one protruded portion 52 of the support arm 5. The tensile springs 432 give a downward moment of force to the gyro block 4 to share the gravity weight of the supported article. Therefore, the arrangement of the traction mechanism 43 enables the second torsion mechanism 6 to lock the gyro block 4 and the axle block 33 with less amount of torque. According to tests, the traction mechanism 43 shares about 70% of the gravity weight of the supported article.

Figure 7:
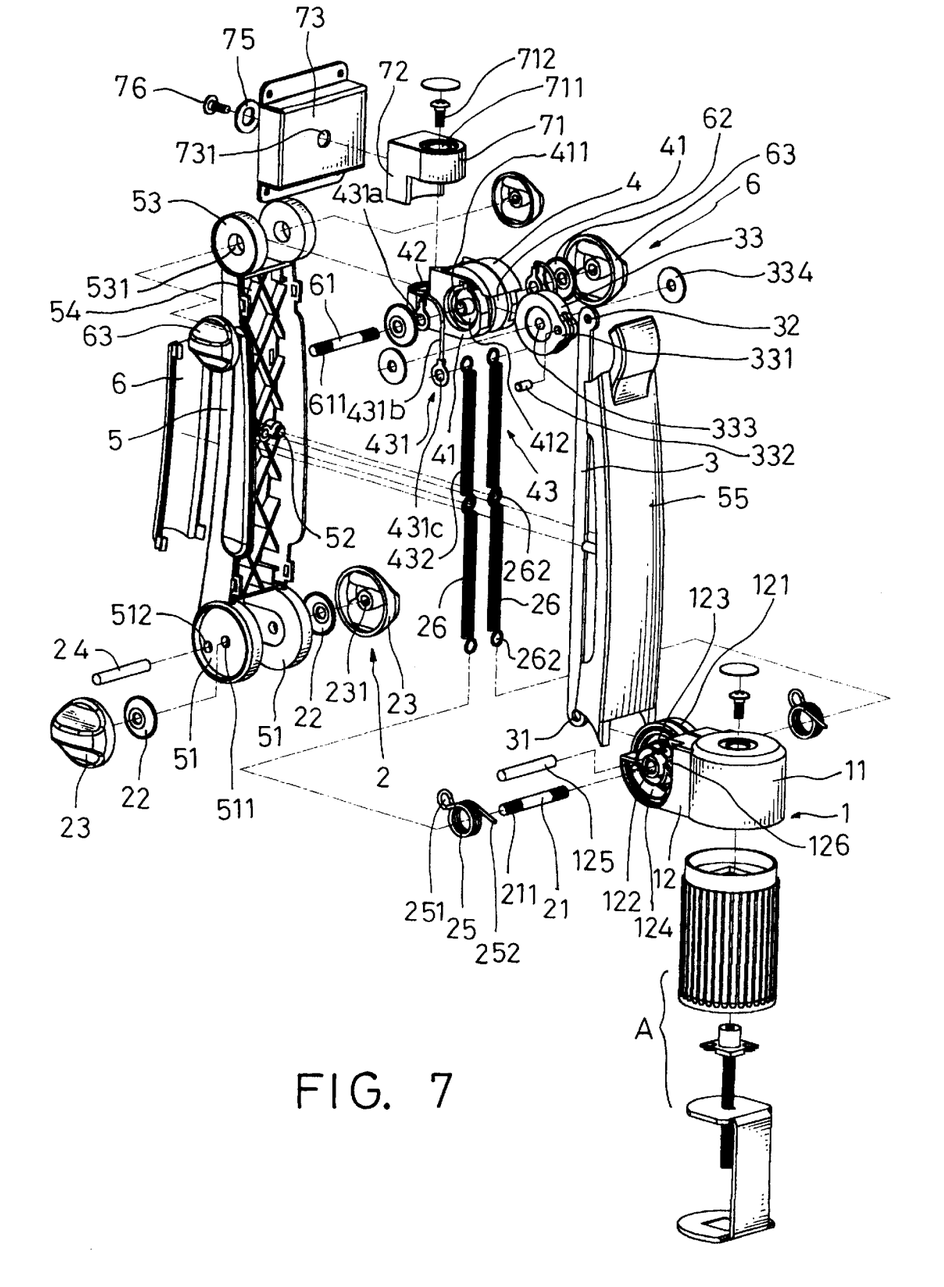
FIG. 7 is an exploded view of a suspension arm according to the second embodiment of the present invention.
Figure 8:
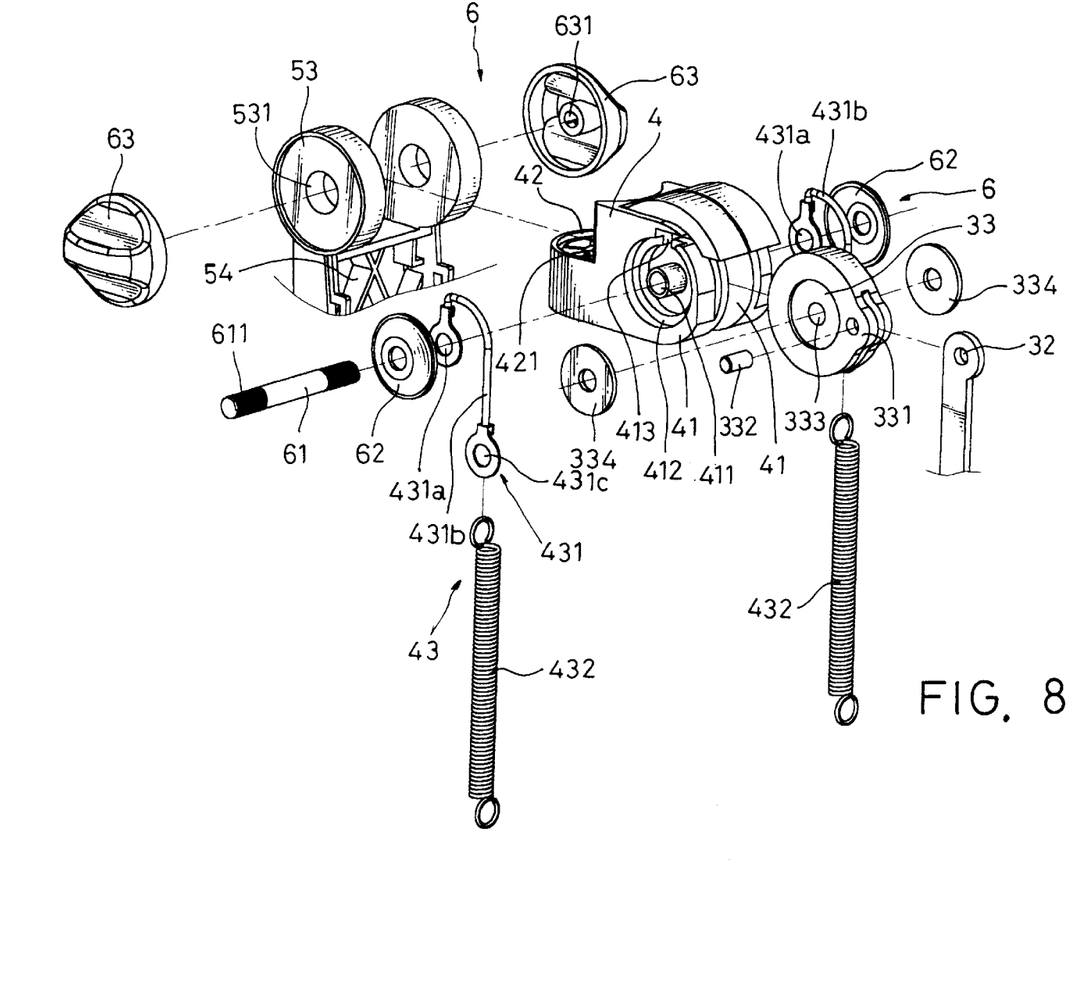
FIG. 8 is an exploded view in an enlarged scale of a part of the second embodiment of the present invention.

Further, an arched wire tube 56 is provided in one side of the support arm 5 for the passing of wire members, for example, the power cord or signal line of the supported article.

Figure 9:
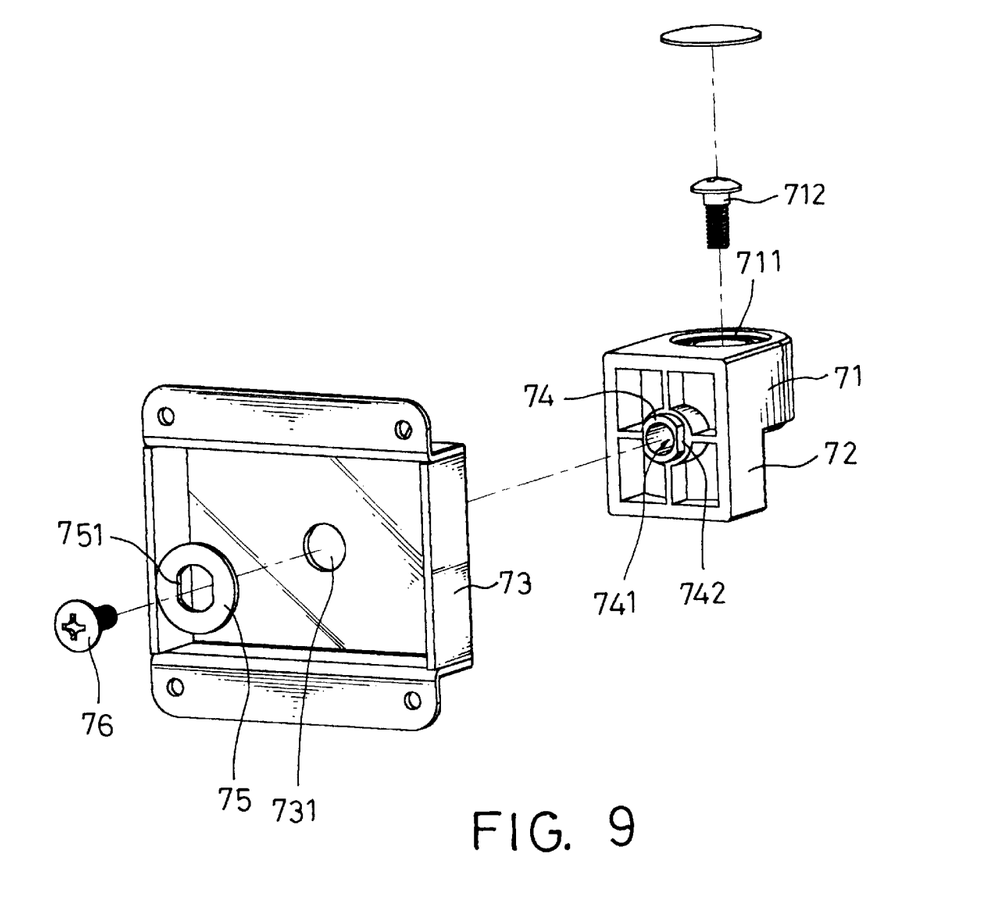
FIG. 9 is an exploded view in an enlarged scale of the swivel holder according to the second embodiment of the present invention.
Figure 10:
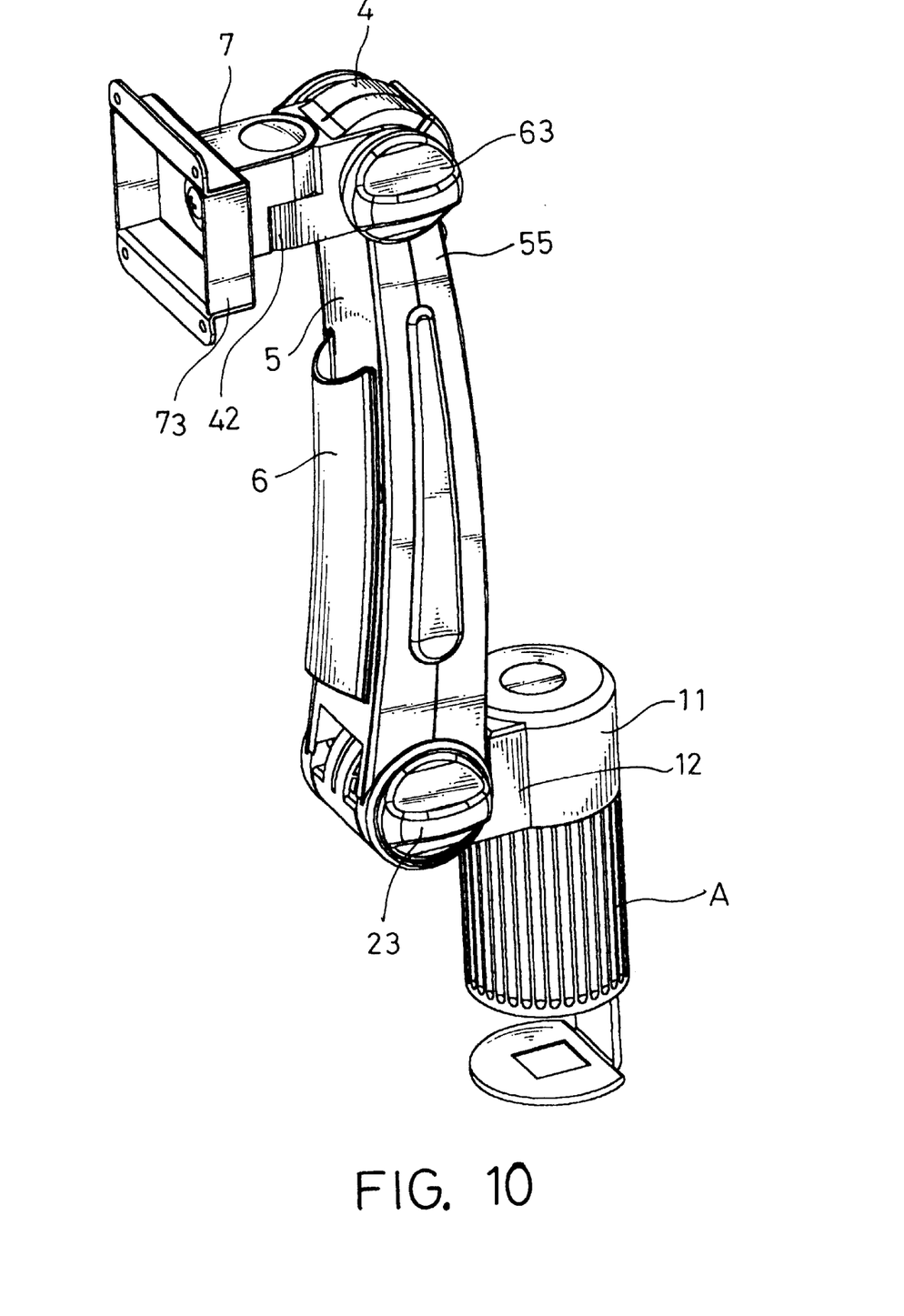
FIG. 10 is a perspective assembly view of the second embodiment of the present invention.

In order to let the mounting frame 73 be rotated relative to the stepped holder block 71, the stepped holder block 71 is made having a stub mounting rod 74 perpendicularly extended from the front support portion 72 for holding the mounting frame 73. The stub mounting rod 74 has a center screw hole 741 and two planes 742 in the periphery at two opposite sides. The mounting frame 73 has a center mounting hole 731, which receives the stub mounting rod 74 of the stepped holder block 71. After insertion of the stub mounting rod 74 of the stepped holder block 71 through the center mounting hole 731 of the mounting frame 73, a washer is sleeved onto the stub mounting rod 74 and stopped at the inside wall of the mounting frame 73 opposite to the front support portion 72 of the stepped holder block 71, and then a lock screw 76 is threaded into the center screw hole 741 of the stub mounting rod 74 to force the washer 75 against the inside wall of the mounting frame 73 and to fix the mounting frame 73 to the stepped holder block 71, prohibiting rotary motion of the mounting frame 73 on the stub mounting rod 74 of the stepped holder block 71. The washer 75 has two straight cuts 751 disposed in the inner diameter thereof and fitting the planes 742 of the stub mounting rod 74.

As indicated above, when the first and second torsion mechanisms respectively rotated to produce a suitable torsional force (subject to the gravity weight of the LCD supported on the mounting frame of the swivel holder), the coupling structure between the bottom end of the support arm and the mounting base as well as the coupling structure between the top end of the support arm and the gyro block are locked, holding the supported article in the desired position. When loosened the screw fixing the swivel holder to the gyro block, the supported article can be turned with the swivel holder horizontally on the gyro block about the screw fixing the swivel holder to the gyro block. Further by means of the effect of the spring force of the tensile springs and the torsional springs, the support arm does not fall when adjusted, and the user can return the support arm with less effort. The arrangement of the traction mechanism between the gyro block and the support arm imparts a downward pulling force to the gyro block to share the burden of the gravity weight of the supported article, preventing excessive friction between the second torsion mechanism and the gyro block. When loosen the lock screw fixing the mounting frame to the stepped holder block, the supported article can be rotated with the mounting frame on the stub mounting rod of the stepped holder block to the desired angle.

A prototype of suspension arm has been constructed with the features of FIGS. 1~10. The suspension arm functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A suspension arm comprising
    a mounting base, said mounting base comprising a cap-like body for mounting, and a circular locating block forwardly protruded from the periphery of said cap-like body, said circular locating block having a split radially extended on the middle, a center axle hole extended through two opposite lateral sidewalls thereof at the center, two pin holes aligned in said two opposite lateral sidewalls, and a pivot pin mounted in the pin holes of said mounting base;
    an axle block, said axle block having a center through hole and two eyed lugs extended from the periphery thereof and arranged in parallel;
    a link, said link having a bottom eyelet extended from a bottom end thereof and inserted into the split of said circular locating block of said mounting base and coupled to the pivot pin of said mounting base, and a top eyelet extended from a top end thereof and coupled to the eyed lugs of said axle block;
    a gyro block, said gyro block comprising two parallel arms coupled to the eyed lugs of said axle block at two sides, the arms of said gyro block each having a transverse through hole respectively aimed at the center through hole of said axle block;
    an elongated hollow support arm, said support arm comprising two bottom clamping plates arranged in parallel at a bottom side thereof and bilaterally coupled to the circular locating block of said mounting base, said bottom clamping plates each having a center through hole corresponding to the center axle hole of said circular locating block of said mounting base, two parallel top eyelets arranged in parallel at a top side thereof and bilaterally coupled to said gyro block;
    a first torsion mechanism, said first torsion mechanism comprising a screw rod inserted through the center through hole of each of the two bottom clamping plates of said support arm and the center axle hole of the circular locating block of said mounting base, two spring members respectively mounted on the screw rod of said first torsion mechanism at two sides of the bottom clamping plates of said support arm, and at least one knob threaded onto the screw rod of said first torsion mechanism to lock said support arm and said circular locating block of said mounting base; and
    a second torsion mechanism, said second torsion mechanism comprising a screw rod inserted through the center through holes of the top eyelets of said support arm and the through holes of the arms of said gyro block, two spring members respectively mounted on the screw rod of said second torsion mechanism at two sides of the top eyelets of said support arm, and at least one knob threaded onto the screw rod of said second torsion mechanism to lock said support arm and said gyro block.

2. The suspension arm as claimed in claim 1 wherein the cap-like body of said mounting base is fastened to the top side of a mounting assembly adapted to be fastened to the top of a table.

3. The suspension arm as claimed in claim 1 wherein the top eyelet of said link is inserted in between the two eyed lugs of said axle block and pivotally secured thereto by a pivot pin.

4. The suspension arm as claimed in claim 3 wherein the distance between the pivot pin of said mounting base and the pivot pin being fastened to the top eyelet of said link and the eyed lugs of said axle block is equal to the distance between the screw rod of said first torsion mechanism and the screw rod of said second torsion mechanism, forming a parallelogram.

5. The suspension arm as claimed in claim 1 further comprising a guide pin fastened to the bottom clamping plates of said support arm, and two torsional springs mounted on the screw rod of said first torsion mechanism at two sides of the circular locating block of said mounting base and connected between the guide pin at the bottom clamping plates of said support arm and the circular locating block of said mounting base, said torsional springs each having a hooked first end respectively hooked on two distal ends of said guide pin and a second end fastened to a respective locating notch in the center axle hole of the circular locating block of said mounting base.

6. The suspension arm as claimed in claim 1 further comprising two tensile springs bilaterally coupled between the pivot pin of said mounting base and said support arm, said tensile springs each having a bottom end hooked on one end of the pivot pin of said mounting base and a top end hooked on a respective protruded portion inside of said support arm.

7. The suspension arm as claimed in claim 1 wherein said axle block has two friction rings respectively set in two recessed opposite sidewalls thereof in contact with the two parallel arms of said gyro block.

8. The suspension arm as claimed in claim 1 wherein said support arm has intersected reinforcing ribs on the inside.

9. The suspension arm as claimed in claim 1 wherein said support arm is covered with a cover to keep said link from sight.

10. The suspension arm as claimed in claim 1 wherein said gyro block comprises a circular body integral with the arms thereof at one end, said circular body having a vertical center through hole, and a swivel holder is coupled to said circular body for holding an article, said swivel holder comprising a stepped holder block, said stepped holder block having a vertical mounting hole, and a screw mounted in the vertical mounting hole of said stepped holder block and threaded into the vertical center through hole of said circular body of said gyro block to fix said swivel holder to said gyro block and to let said swivel holder.

11. The suspension arm as claimed in claim 10 wherein said swivel holder further comprises a mounting frame fastened to a front side of said stepped holder block for holding an article.

12. The suspension arm as claimed in claim 11 wherein said mounting frame is adapted to hold a LCD (liquid crystal display).

13. The suspension arm as claimed in claim 1 wherein said first torsion mechanism and said second torsion mechanism each comprise two knobs respectively threaded onto two ends of the respective screw rod.

14. The suspension arm as claimed in claim 13 wherein the screw rods of said first torsion mechanism and said second torsion mechanism each have two reversed threads at two ends.

15. The suspension arm as claimed in claim 1 wherein the spring members of said first torsion mechanism and said second torsion mechanism are spring washers.

16. The suspension arm as claimed in claim 1 wherein the arms of said gyro block each have an annular groove around the respective transverse through hole and a top notch extended to said annular groove; a traction mechanism is connected between said gyro block and said support arm, said traction mechanism comprising two connecting devices, said connecting devices each comprising a cord member inserted through the top notch of one arm of said gyro block, a first eyelet provided at one end of said cord member and hung on the screw rod of said second torsion mechanism, and a second eyelet provided at an opposite end of said cord member and, and two tensile springs respectively coupled between the second eyelets of said connecting devices and respective protruded portions inside said support arm.

17. The suspension arm as claimed in claim 1 wherein said support arm comprises a wire tube for the passing of wire members from the article to be supported on the suspension arm.

18. The suspension arm as claimed in claim 11 wherein said stepped holder block of said swivel holder has a stub mounting rod perpendicularly extended from a front support portion thereof, said stub mounting rod having a center screw hole and two planes in the periphery thereof at two opposite sides; said mounting frame of said swivel holder has a center mounting hole, which receives the stub mounting rod of said stepped holder block; said swivel holder further comprises a washer sleeved onto the stub mounting rod of said stepped holder block and stopped at an inside wall of said mounting frame opposite to said stepped holder block, and a lock screw threaded into the center screw hole of said stub mounting rod to hold down said washer and to fix said mounting frame to said stepped holder block in position, said washer having two straight cuts fitting the two planes of said stub mounting rod.

\* \* \* \* \*